Nov. 10, 1970    A. N. TSERGAS    3,539,923
TESTING APPARATUS FOR DETECTING SHORTS, LEAKAGE
AND CONTINUITY IN WINDINGS
Filed Nov. 6, 1967    3 Sheets-Sheet 1

INVENTOR.
ATHANASE N. TSERGAS

BY
ATTORNEYS

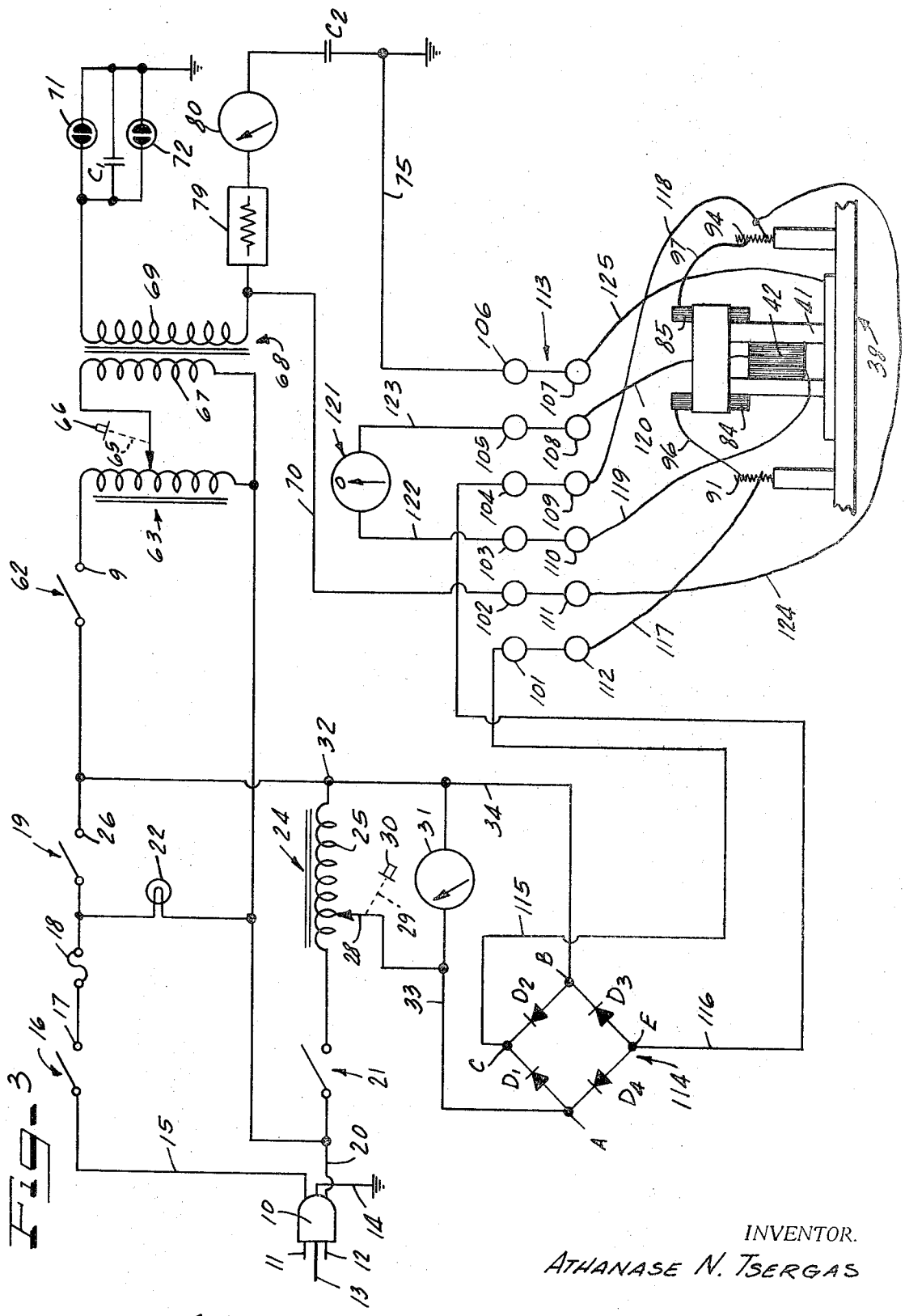

United States Patent Office 3,539,923
Patented Nov. 10, 1970

3,539,923
TESTING APPARATUS FOR DETECTING SHORTS, LEAKAGE AND CONTINUITY IN WINDINGS
Athanase N. Tsergas, Des Plaines, Ill., assignor to Ram Tool Corporation, Chicago, Ill., a corporation of Illinois
Filed Nov. 6, 1967, Ser. No. 680,932
Int. Cl. G01r 31/06
U.S. Cl. 324—158          10 Claims

ABSTRACT OF THE DISCLOSURE

A device for testing the fields of motors, generators, or any rotating machine so as to determine if there are any shorts or other faults in the windings of the motor which would render the assembled motor defective. Also, the windings of the motor are tested at high voltage, for leakage and ground.

---

This invention relates in general to a field testing apparatus for the field coils of a motor or generator, as above, and in particular to apparatus for indicating if there are any shorts, open windings, leakages or other defects in the windings.

The winding is tested at the normal operating voltage, and also at a voltage which is many times the normal level so as to determine if there is any leakage or shorts.

It is an object of the present invention, therefore, to provide an improved tester for the field of rotary electrical machinery such as motors and generators.

Yet another object of the invention is to provide a novel testing circuit in which the field winding of a motor or other electrical machine may be tested at a desired high voltage.

Still another object of the invention is to provide a motor field winding testing apparatus capable of allowing field windings to be simply and accurately tested by relatively inexperienced personnel such that faults in such windings are rapidly detected.

A feature of this invention is found in the provision for an electromagnet formed with a central pillar upon which may be placed the field assembly of an electric motor or other electrical rotating device. Means are provided for connecting the input and output of the windings of the field to a fixture upon which the electromagnet is mounted. A low voltage supply provides normal operating voltage potential to the field through the testing apparatus to test for open and short circuits and correct connections of the field. Secondly, a high voltage source is connected to the field so as to test for leakage and high voltage shorts.

Another feature of the invention is found in the provision for applying the energizing operating and high voltage to the electromagnet and noting the induced voltage in the field being tested.

Further features, objects and advantages of this invention will become apparent from the following description and claims when read in view of the drawings in which:

FIG. 3 is a schematic view of a modification of the invention.

Figure 2:
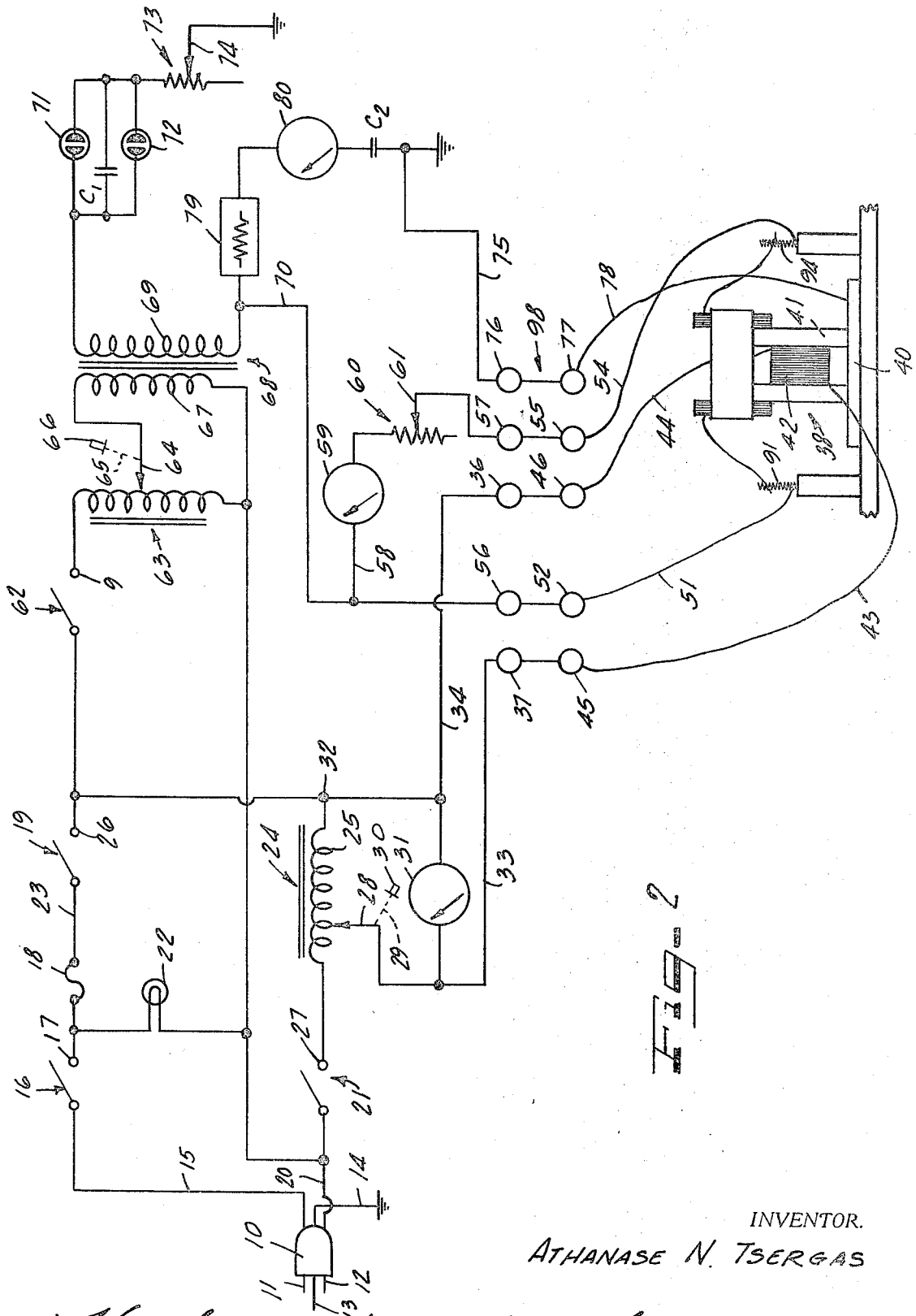
FIG. 2 is a schematic diagram of the tester of the invention.

FIG. 2 illustrates a power plug 10 which is provided with a pair of power prongs 11 and 12, and a grounded prong 13. The grounded prong is connected by a suitable grounding lead 14 to the chassis of the tester. The power prongs 11 and 12 are inserted into a socket of a suitable alternating current power supply. Prong 11 is connected by lead 15 to the movable contact of an on-off switch 16. The on-off switch 16 has an output contact 17 which is connected through a fuse 18 to a switch 19. The other power prong 12 is connected through lead 20 to a movable contact of switch 21. A power indicator light 22 is connected across the leads 20 and 23 and when lighted indicates that the power to the tester has been turned on.

A Variac 24 has its coil 25 connected between the open contact 26 of switch 19, and the open contact 27 of switch 21. A slide contact 28 engages the coil 25 and is controlled by a shaft 29 which has a suitable knob 30 for adjusting the voltage across the Variac 24. A voltmeter 31 is connected from point 32 at one end of winding 25 to the slide contact 28, and thus the voltage across the voltmeter may be varied by moving the contact 28 with the knob 30 and shaft 29.

Leads 33 and 34 are connected across the Variac to point 32 and to the wiper contact 28 and are connected to contacts 36 and 37, respectively, of socket terminal 35.

A plug in test board designated generally at 38 is formed of an insulating base plate 39 upon which is mounted an electromagnet 41.

Figure 1:
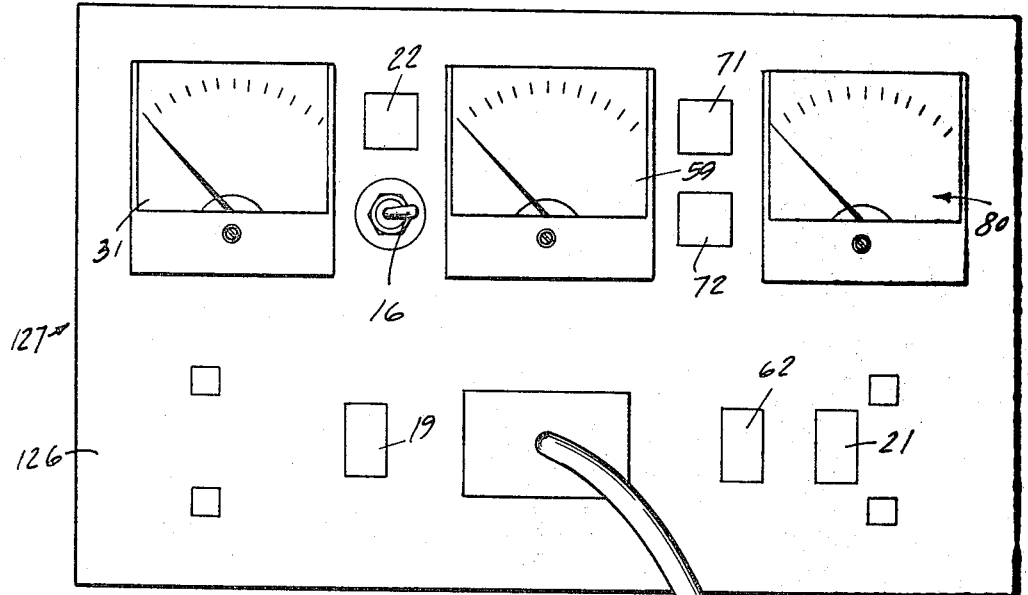
FIG. 1 is the front panel view of the tester of this invention with the plug in test board connected.
Figure 1:
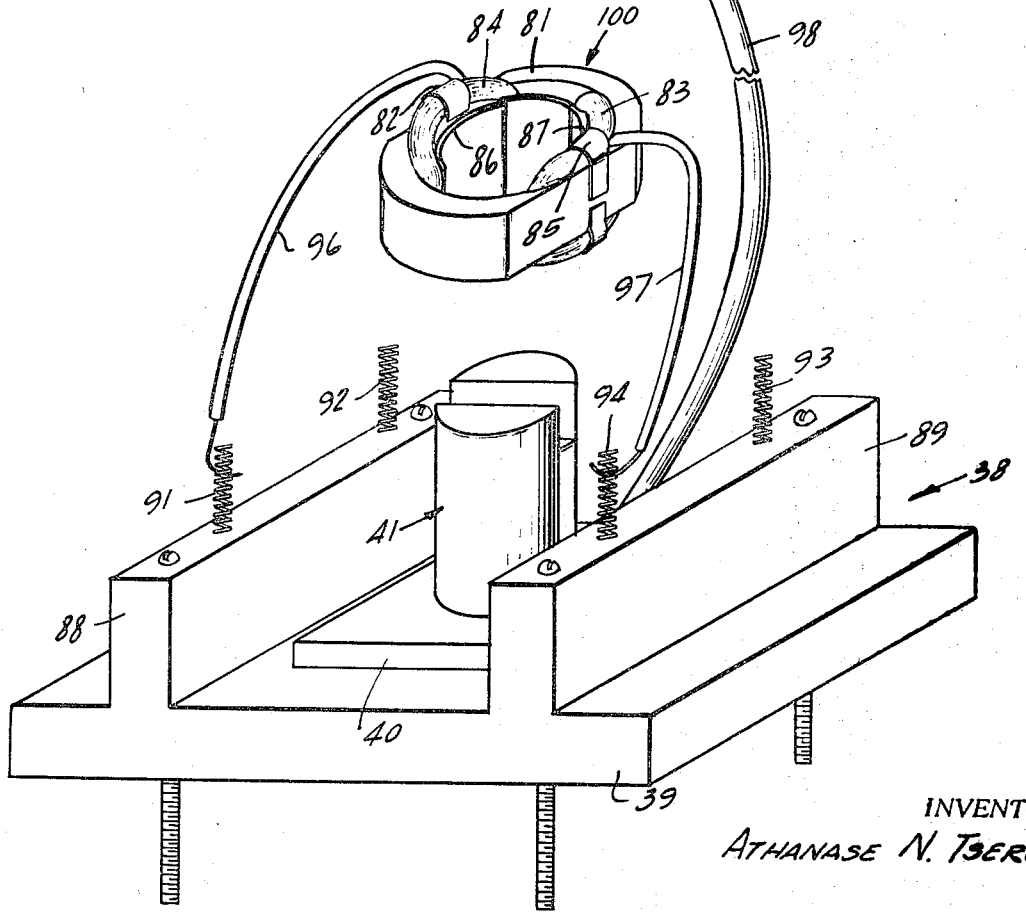

As best shown in FIG. 1, the electromagnet 41 is mounted on a conducting plate 40 and is formed such that it is generally cylindrical in shape and extends upwardly from the test plate 39. It is wound with a suitable winding 42. The external diameter of the electromagnet 41 is slightly smaller than the internal diameter of the field assembly which is to be tested by the apparatus such that the field to be tested may be placed over the electromagnet for testing purposes. Leads 43 and 44 extend from the energizing winding 42 of the electromagnet 41 to contacts 45 and 46, respectively on the plug in test board 38. During operation, contacts 45 and 46 are connected to contacts 37 and 36 of the tester by a suitable extension cable.

As is shown in FIG. 1, the electromagnet 41 extends upwardly and a field coil assembly 100 which is to be tested is received over the electromagnet 41. The field coil assembly 100 is constructed with an annular magnetic supporting member 81 which is formed of a plurality of laminated members and is formed with two coil supporting portions 82 and 83 internally of the structure so as to support a pair of windings 84 and 85 which energize pole pieces 86 and 87. It is to be realized, of course, that an armature (not shown) is mounted within the pole pieces 86 and 87 in the assembled motor and is energized by the field generated by the windings 84 and 85 in a well known manner.

It is a purpose of the present testing device to determine if the field has been properly constructed such that all connections are good and also to assure that there are no shorts from the motor winding to the various metallic portions of the yoke of the motor which would cause failure of the motor.

Also attached to the base plate 39 are a pair of upright insulating members 88 and 89 upon which are mounted electrically conducting spring members 91, 92, 93 and 94. Two of these (92 and 93) are electrically connected together so that they are at the same electrical potential, and the other two are connected to the input and output 96 and 97 of windings 84 and 85 being tested. Spring member 91 is connected by lead 51 to terminal 52 and spring 94 is connected by a lead 54 to terminal 55. Cable 98 connects terminal 52 to contact 56 in the tester and terminal 55 to contact 57 in the tester. The cable 98 extends between the tester and plug in test board 38 in use. Contact 56 is connected by lead 58 to a meter 59. The other side of the meter 59 is connected to a rheostat 60 which has a wiper contact 61. The wiper contact 61 is connected in turn to contact 57.

In operation for the first test the switches 16, 19 and 21 would be closed thus applying a voltage as set by contact 28 such as, for example, 20 volts to the electromagnet 41 through contacts 37, 36. The field 100 being tested is placed over the electromagnet 41, and its input and output leads 96 and 97 are connected to springs 91 and 94. If the field is good, the electromagnet 41 will induce a voltage in the field windings 84 and 85 which will be detected by the meter 59. With a commonly tested field, the application of 20 volts to the electromagnet 41 will induce a voltage of four volts in the field under test. Thus, with the contact 28 of the Variac 24 adjusted to 20 volts, the meter 59 should read 4 volts. This also indicates the correct number of turns in the windings. Of course, with more or less turns, meter 59 would indicate more or less than 4 volts.

If a broken wire exists in the field or if there is varnish which insulates and prevents electrical contact being made to the field, no reading will appear on meter 59. This could mean that there is a broken coil or that there is insulation in series with the coil. The operator then rejects the coil.

If the motor passes the first test, then a high voltage test is made. For this purpose, a switch 62 is connected to contact 26 of the switch 19, and a high voltage Variac 63 is connected between normally open contact 9 of switch 62 and the input line 20. A slide contact 66 engages the coil of the Variac 63 and is controlled by a shaft 65 which has a knob 66. Thus, by moving knob 66, the contact 64 may be adjusted to vary the voltage across the primary 67 of a transformer 68. The secondary 69 of the transformer 68 has one side connected by lead 70 to contact 56. The other side of the transformer 69 is connected to a first side of a first neon indicator 71 which is in parallel with a condenser $C_1$. A second neon bulb 72 is connected across neon 71. A sensitivity adjustment 73 which comprises a resistor $R_1$ and a grounded wiper contact 74 is connected to neons 71, 72 and condenser $C_1$.

The other side of secondary 69 is connected to a multiplier 79 in series with a high range voltmeter 80. The other side of voltmeter 80 is connected to a condenser $C_2$ which has its opposite side connected to ground. Lead 70 connects one side of secondary 69 to contact 56 which is connected by cable 98 to contact 52. A lead 75 extends from ground to contact 76 which is connected by cable 98 to contact 77 of the plug in test board 38. Lead 78 is electrically connected to the electromagnet 41.

For the high voltage test, the switches 19 and 62 are closed and switch 21 is open thus applying energizing voltage through the Variac 63 to the high voltage transformer 68. The variable contact 64 is adjusted by the knob 66 and shaft 65 until the meter 80 indicates the desired testing voltage which might be for example 1500 volts.

This high voltage is applied through contacts 56 and 52 and lead 51 to the windings under test, and the other side is connected by the lead 75, contacts 76, 77 and lead 78 to the electromagnet 41. If there is any leakage to ground, leakage light 71 will come on. If there is a direct short to ground, light 72 will also be lighted. It is to be realized, of course, that the pole pieces 86 and 87 of the test field is made of conducting electrical material, and that the outer surface of the electromagnet 41 is electrically conducting such that any short or leakage of the winding will be grounded through the ground return from the electromagnet 41.

The operator knows that if light 71 or both lights 71 and 72 come on, the field is to be rejected.

FIG. 3 illustrates a modification of the invention which is very similar to that shown in FIG. 2. However, the voltage applied during the low voltage test is polarized such that the terminal 94 will always be positive, and the terminal 91 will always be negative.

Since many of the components of FIG. 3 are common with those in FIG. 2, the apparatus which is common has been numbered in the same fashion.

A full wave rectifier 114 comprising suitably poled diodes $D_1$, $D_2$, $D_3$ and $D_4$ is supplied on input at points A and B by leads 33 and 34. A polarized output is removed by leads 115 and 116 connected to points C and E of the bridge. A negative voltage is supplied by lead 115 to contact 101 and a positive voltage is supplied by lead 116 to contact 104. A cable 113 connects contact 101 with contact 112 of the plug in test board 38 and the cable connects contact 104 to contact 109 of the test board. Lead 117 connects contact 112 with spring contact 91 and lead 118 connects contact 109 with spring contact 94. The field under test has its input and output leads 96 and 97 connected to contacts 91 and 94.

In this embodiment, the voltages are applied to the test field and a voltage is induced in the electromagnet if the field coils are good. Due to the law of reciprocity, either the field being tested or the electromagnet may be energized.

Leads 119 and 120 are connected to winding 42 of the electromagnet 41. Lead 119 is connected to contact 110 and by cable 113 to contact 103. Lead 120 is connected to contact 108 and by cable 113 to contact 105.

A zero-center meter 121 is connected by leads 122 and 123 across contacts 103 and 105.

In the low voltage test switches 16 and 21 are closed and a polarized voltage is applied to the field windings 84 and 85 being tested. If the meter 121 deflects from zero in one direction, the operator knows that the field is good. If no deflection occurs, the operator knows the field is bad. Also, if the meter deflects the wrong way, the field is reversed and will be rejected.

For high voltage test with the structure of FIG. 3, switch 21 is opened and switches 16, 19 and 62 are closed. Lead 70 connects one end of the high voltage secondary 69 to contact 94 through contact 102, cable 113, contact 112 and lead 124.

Lead 125 is connected to the electromagnet 41 and to the grounded chassis of the tester through contact 107, cable 113, contact 106 and lead 75. If leakage occurs, neon light 71 will come on and if a ground exists, both neon lights 71 and 72 will come on. If either lights come on, the field is rejected as faulty.

FIG. 1 illustrates the face 126 of the tester 127 with the various meters, switches and lights shown.

I claim:

1. Apparatus for testing the field winding of a field structure for an electrical rotating machine comprising an electromagnet formed with a pillar and having a conducting plate, the field structure formed with a central opening and received over the pillar, means for exciting the electromagnet, means connected to the field winding to detect inducted voltage in the field, a first switching means connected in circuit with the means for exciting the electromagnet for selectively disconnecting it, a high voltage source with one side electrically connected to the winding of the field being tested and the other side connected to the electromagnet, the field supporting structure in electrical contact with the electromagnet and the field of a good field structure insulated from the field supporting structure, means for indicating leakage or a short in the field winding and a second switching means for disconnecting the high voltage source from the field winding when the first switch is closed.

2. In apparatus acording to claim 1 wherein the means for indicating leakage or a short in the field winding comprises a light bulb.

3. In apparatus according to claim 2, a second light bulb, a capacitor in parallel with the second light bulb, and the second light bulb and the capacitor connected in parallel with the first light bulb such that the first light bulb indicates a short in the field winding and the second light bulb indicates leakage in the field winding.

4. In apparatus according to claim 3 wherein the first and second light bulbs are neons.

5. In apparatus according to claim 1, a Variac connected in circuit with the high voltage source for varying it.

6. In apparatus according to claim 5, indicator means connected across the high voltage source.

7. Apparatus for testing the field winding of a field structure for an electrical rotating machine comprising, an electromagnet formed with a pillar and having a conducting plate, the field structure formed with a central opening and received over the pillar, means for exciting the field of the field structure, means connected to the electromagnetic winding to detect induced voltage in said winding, a rectifier connected in series between the means for exciting the field and the field to apply a polarized voltage thereto, the means connected to the electromagnetic winding to detect induced voltage including a voltmeter, a first switching means connected in circuit with the means for exciting the field to selectively disconnect it, a high voltage source, a second switching means in circuit with the voltage source for selectively disconnecting it, the field structure in electrical contact with the pillar of the electromagnet, one side of the high voltage source connected through the second switching means to the field winding, the other side of the high voltage source connected to the pillar of the electromagnet, and indicator means connected in circuit with the high voltage source to indicate a fault in the field winding.

8. In apparatus according to claim 7, a light bulb connected in series with the high voltage source to indicate a short to ground in the field winding.

9. In apparatus according to claim 8, a second light bulb, a capacitor in parallel with the second light bulb and the combination connected in parallel with the first light such that if the second light bulb is illuminated, leakage in the field winding exists, and if both light bulbs are illuminated, a short in the field winding exists.

10. In apparatus acording to claim 9 wherein the light bulbs are neons.

References Cited
UNITED STATES PATENTS

| | | | |
|---|---|---|---|
| 2,103,179 | 12/1937 | Rennau | 324—34 XR |
| 2,222,110 | 11/1940 | Maurer | 324—51 XR |
| 3,231,817 | 1/1966 | Bailey | 324—55 XR |
| 3,277,364 | 10/1966 | Abrahamson | 324—51 XR |

ALFRED E. SMITH, Primary Examiner

U.S. Cl. X.R.

324—34, 51